Figure 1:
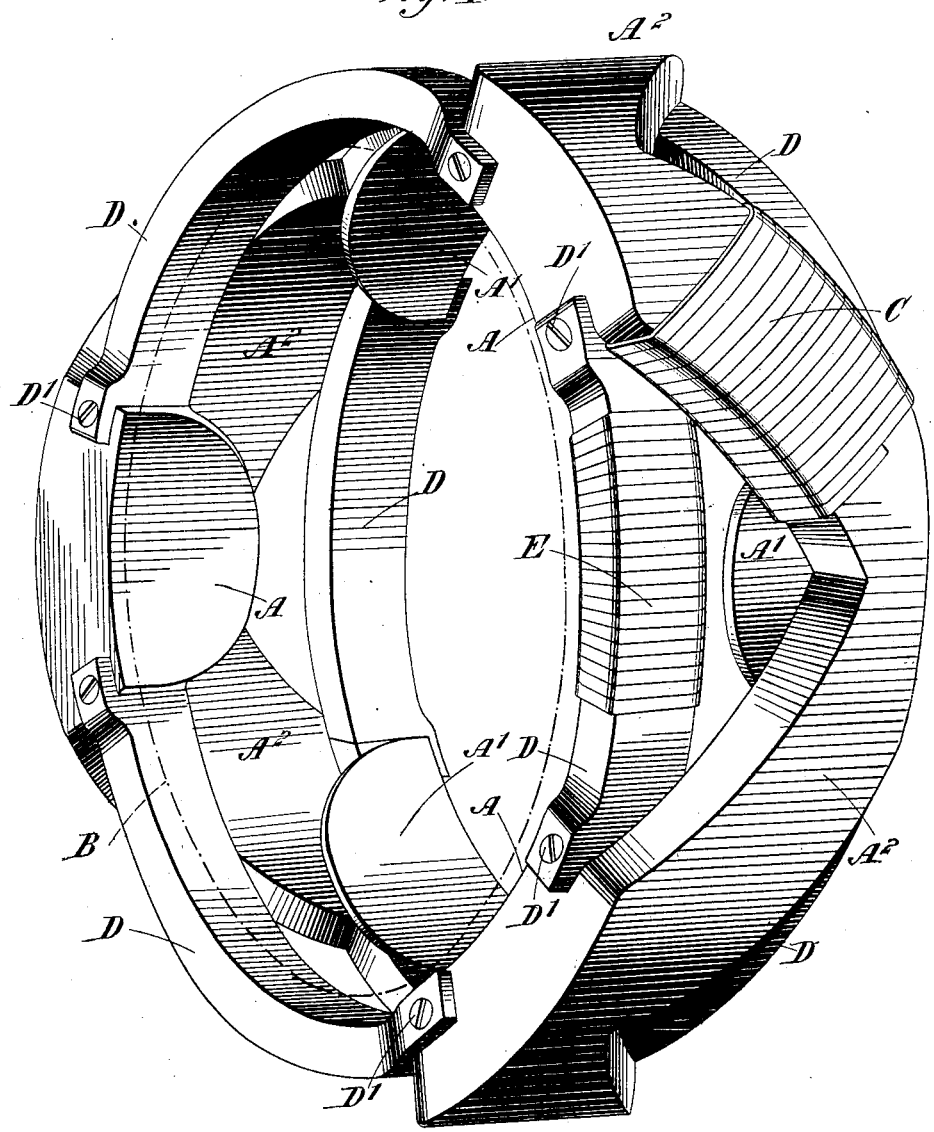

No. 658,012. Patented Sept. 18, 1900.
M. H. HURRELL.
DYNAMO ELECTRIC MACHINE.
(Application filed Feb. 13, 1900.)

(No Model.) 2 Sheets—Sheet 1.

Witnesses:

Inventor:
Mark H. Hurrell
by Church & Church
his Attorneys.

No. 658,012. Patented Sept. 18, 1900.
M. H. HURRELL.
DYNAMO ELECTRIC MACHINE.
(Application filed Feb. 13, 1900.)
(No Model.) 2 Sheets—Sheet 2.
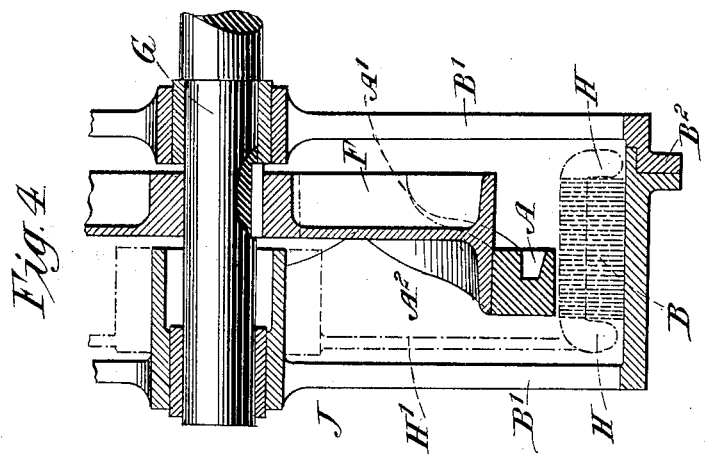
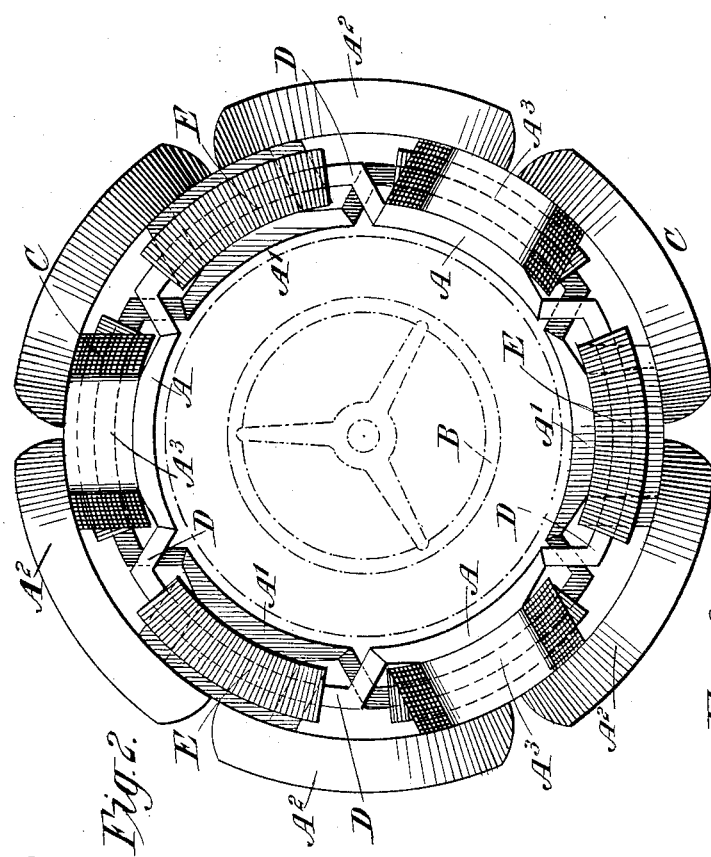
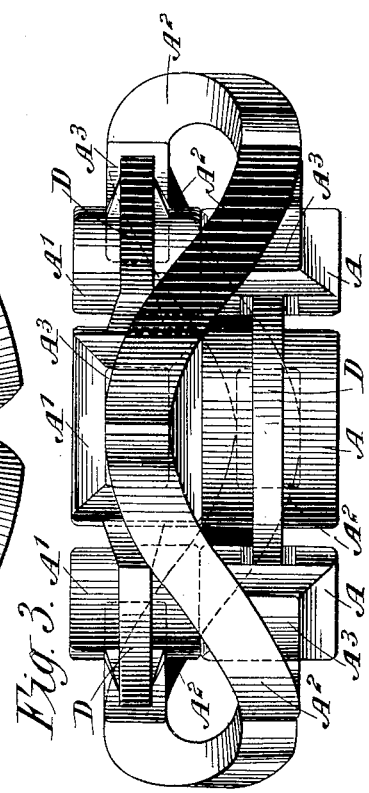
Witnesses:
Inventor:
Mark H. Hurrell
by Church & Church
his Attorneys.

UNITED STATES PATENT OFFICE.

MARK HENRY HURRELL, OF WIMBLEDON, ENGLAND.

DYNAMO-ELECTRIC MACHINE.

SPECIFICATION forming part of Letters Patent No. 658,012, dated September 18, 1900.

Application filed February 13, 1900. Serial No. 5,038. (No model.)

*To all whom it may concern:*

Be it known that I, MARK HENRY HURRELL, a subject of the Queen of England, residing at Wimbledon, county of Surrey, England, have invented certain new and useful Improvements in or Relating to Dynamo-Electric Machines, (for which I have made application for Letters Patent in Great Britain, No. 14,736, dated July 18, 1899, and No. 18,868, dated September 19, 1899,) of which the following is a specification.

This invention relates to improvements in dynamo-electric machines, and it has particular reference to the field-magnets of such machines.

The object of the invention is the construction of a machine which is of small weight for its output and in which sparking at the brushes, due to variation in the load, is reduced to a minimum.

The improvements are particularly applicable to small machines such as are used as motors for driving self-propelled vehicles.

In machines according to this invention the field-magnets comprise two series of poles, one series operating upon one peripheral annulus of the armature-surface and the other series upon another peripheral annulus. Preferably each of the peripheral annuli approximately covers half the length of the armature. The members constituting one series are all north poles, while those forming the other series are of opposite polarity. The poles are disposed symmetrically with regard to the circumference of the armature, the members of the one series being placed alternately with those of the other series. All the poles are joined by oblique yokes, which form a zigzag ring within or around the circle in which the poles lie, and conveniently the poles and yokes may form part of one casting. By arranging each series of poles in such a manner that they operate only upon one-half of the armature losses in the core due to hysteresis are reduced to a minimum. The exciting-coils proper are wound either upon the oblique yokes or upon limbs or stems supporting the pole-pieces. The arrangement of oblique yokes leaves gaps between the neighboring poles of each series, and in these gaps compensating coils are inserted, connected in series with the armature-winding. The function of these coils is to compensate for or counteract the distortion of the magnetic field caused by the armature reactions, and according to this invention this compensation can be effected in a very efficient way, for by acting between two poles of like name each compensating coil can when the machine is used as a generator decrease the density of the magnetic lines in the leading horn and increase such density in the trailing horn, thus tending to restore the field to its normal condition. When the machine is used as a motor, the compensating coil acts in the reverse direction, tending to increase the density of the lines in the leading horn and decrease it in the trailing horn.

In the accompanying drawings, Figure 1 is a perspective view of one construction of field-magnet according to this invention. Fig. 2 is a side elevation showing, diagrammatically, a machine having field-magnets according to this invention. Fig. 3 is a plan of the same with a portion removed; and Fig. 4 is a sectional elevation showing a portion of another machine, also according to this invention.

Like letters indicate like parts throughout the drawings.

With reference first to Fig. 1, the field-magnets comprise two series of poles A and A', connected by oblique yokes $A^2$. The poles A extend inward, and their faces are of sufficient depth to operate upon a peripheral annulus approximately equal to one-half of the length of an armature B, which in this form of machine rotates within the field-magnet ring. The armature is merely indicated in chain lines in Fig. 1, in order that the shape of the field-magnets may be clearly shown. The poles A' are spaced alternately with the poles A and operate upon the other half of the armature. Preferably the edges of the pole-pieces are curved in order that the sections of the armature-winding may pass into and out of the field gradually, and thus avoid sudden changes in the value of the electromotive force. It is found that good results are obtained in practice if the leading and trailing edges of the pole-pieces take the form of part of a sine curve. Upon each of the oblique yokes $A^2$ exciting-coils C are wound, connected so as to make all the poles A of one polarity, and all the poles A' of the opposite polarity. Bridging across the V-shaped gap between each pair of poles A A or A' A' is a magnetic connecting-piece D, secured to the poles by lugs and screws D', and a compensating coil E is wound upon each connecting-piece D.

The construction illustrated in Figs. 2 and 3 is substantially similar to that shown in Fig. 1, the chief difference being that the poles A and A' are carried on limbs $A^3$, which extend radially inward from the zigzag ring formed by the oblique yokes $A^2$. The compensating coils E, with their magnetic cores D, are placed between the adjacent horns of neighboring poles of like name, the cores D being secured to the pole-pieces in any convenient way. The coils C and E are omitted from Fig. 3 for the sake of clearness.

Machines according to this invention are not necessarily of the type in which an armature revolves within a ring-like field-magnet. The poles may be upon the outside of the zigzag ring formed by the oblique yokes, and the armature may be placed as a ring outside the field-magnets. Such an arrangement is very suitable for employment as the motor for a self-propelled vehicle and is illustrated, diagrammatically, in Fig. 4, in which one of the poles A is seen in section. The field-magnet ring is carried upon a spider, one arm of which is shown at F, the spider being secured to a fixed axle G. The armature B, which in this case would preferably comprise a number of stamped rings, is carried upon two disks or cases B', which are capable of revolving around the fixed spindle G and are connected, as by flanges $B^2$, so as to be readily detachable. The armature-winding, which is indicated at H, is joined by connections H' to a commutator J. The revolving casing B', carrying the armature, may conveniently form part of the road-wheel. Details of construction of this particular machine are not given, as the figure is intended merely to illustrate the inverted form of dynamo or motor according to this invention.

It is of course to be understood that the exciting-coils in machines according to this invention may be connected up either in series or as a shunt to the armature, or, if desired, they may be separately excited. Further, although the machines illustrated have six poles—namely, three of each polarity—the invention is equally applicable to machines having a greater or less number of poles. Again, the compensating coils according to this invention may be applied to any machine in which poles of like name are adjacent to one another.

What I claim as my invention, and desire to secure by Letters Patent, is—

1. In a dynamo-electric machine a field-magnet comprising a series of like poles symmetrically spaced and arranged to operate upon one peripheral annulus of an armature, a second series of like poles of opposite polarity to the first series, the poles of the second series being spaced alternately with those of the first series and arranged to operate upon another peripheral annulus of the armature, oblique yokes magnetically joining all the poles and coils operating to magnetize the poles, substantially as set forth.

2. In a dynamo-electric machine a field-magnet comprising a series of like poles symmetrically spaced and arranged to operate upon one peripheral annulus of an armature, a second series of like poles of opposite polarity to the first series, the poles of the second series being spaced alternately with those of the first series and arranged to operate upon another peripheral annulus of the armature, oblique yokes magnetically joining all the poles, exciting-coils on the yokes and compensating coils acting upon adjacent poles of like name, substantially as set forth.

3. In a dynamo-electric machine a field-magnet comprising a series of like poles symmetrically spaced and arranged to operate upon one peripheral annulus of an armature, a second series of like poles of opposite polarity to the first series, the poles of the second series being spaced alternately with those of the first series and arranged to operate upon another peripheral annulus of the armature, oblique yokes magnetically joining all the poles, exciting-coils on the yokes, magnetic bridge-pieces between adjacent poles of each series and compensating coils upon the bridge-pieces, substantially as set forth.

4. In a dynamo-electric machine the combination with a plurality of like poles, of compensating coils acting between adjacent poles, substantially as set forth.

In testimony whereof I have signed my name to this specification in the presence of two subscribing witnesses.

MARK HENRY HURRELL.

Witnesses:
HAROLD WADE,
HARRY B. BRIDGE.